(12) United States Patent
Li et al.

(10) Patent No.: US 10,819,972 B2
(45) Date of Patent: Oct. 27, 2020

(54) METHOD AND APPARATUS FOR LIGHT AND COMPUTER VISION BASED DIMENSIONAL METROLOGY AND 3D RECONSTRUCTION

(71) Applicants: Yang Li, Georgetown, MA (US);
Helmar Adler, Danvers, MA (US);
Sergio Bermudez, Boston, MA (US)

(72) Inventors: Yang Li, Georgetown, MA (US);
Helmar Adler, Danvers, MA (US);
Sergio Bermudez, Boston, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 168 days.

(21) Appl. No.: 15/969,863

(22) Filed: May 3, 2018

(65) Prior Publication Data
US 2019/0342543 A1    Nov. 7, 2019

(51) Int. Cl.
*H04N 13/275* (2018.01)
*H04N 13/239* (2018.01)
(Continued)

(52) U.S. Cl.
CPC ........... *H04N 13/275* (2018.05); *G06T 7/593* (2017.01); *G06T 7/74* (2017.01); *H04N 13/239* (2018.05);
(Continued)

(58) Field of Classification Search
CPC .... H04N 13/275; H04N 13/239; G06T 7/593; G06T 7/74; G06T 7/90
(Continued)

(56) References Cited

U.S. PATENT DOCUMENTS 8,773,508 B2    7/2014   Daniel et al.
2004/0160594 A1*  8/2004   Suphellen ............ G01B 11/002
                                                356/4.01
(Continued)

FOREIGN PATENT DOCUMENTS

WO       2017041419 A1     3/2017

OTHER PUBLICATIONS

Lepetit, Vincent, et al., "EPnP: An Accurate O(n) Solution to the PnP Problem," Int. J. Comp. Vis. (2009) 81:155, 12 pages, available at http://icwww.epfl.ch/~lepetit/papers/lepetit_ijcv08.pdf.
(Continued)

*Primary Examiner* — On S Mung
(74) *Attorney, Agent, or Firm* — Yutian Ling (57) ABSTRACT

Systems and methods disclosed herein includes a measurement device to enable dimensional metrology and/or 3D reconstruction of an object. The measurement device is positioned between the object and reference luminaires (e.g., light emitting diodes or other light sources). The measurement device uses the reference luminaires to determine the position and orientation of the measurement device. The measurement device may include a camera oriented towards the reference luminaires and may acquire/use images of reference luminaires to determine the position and orientation of the measurement device. Using the reference luminaires, the system may determine positions and orientations of the measurement device when the images of the reference luminaires are taken. The system may be configured to use the positions and the orientations of the measurement device to determine dimensions and/or 3D models of the object.

19 Claims, 6 Drawing Sheets

(51) Int. Cl.
H04N 13/254 (2018.01)
G06T 7/593 (2017.01)
G06T 7/73 (2017.01)
G06T 7/90 (2017.01)

(52) U.S. Cl.
CPC .......... *H04N 13/254* (2018.05); *G06T 7/90* (2017.01); *H04N 2213/001* (2013.01)

(58) Field of Classification Search
USPC ........................................................ 348/47
See application file for complete search history.

(56) References Cited

U.S. PATENT DOCUMENTS

2015/0365653 A1* 12/2015 Tohme .................. G01B 11/14
 348/46
2016/0313114 A1* 10/2016 Tohme ................. G01B 11/005

OTHER PUBLICATIONS

McGlone, Chris J., Manual of Photogrammetry, ASPRS, Sixth Edition, 2013, pp. 266-267, 308-309, 688-689, 785.

* cited by examiner

METHOD AND APPARATUS FOR LIGHT AND COMPUTER VISION BASED DIMENSIONAL METROLOGY AND 3D RECONSTRUCTION

TECHNICAL FIELD

The present disclosure generally relates to the field of dimensional computer vision, metrology, and 3D reconstruction.

BACKGROUND

People use their eyes and their brains to see and visually sense the world around them. Computer vision is a science related to image acquisition and analysis to extract optically acquired information from an environment. Computer vision can be used to perform measurements and other operations that are far superior to what can be achieved by the naked eye.

Dimensional metrology and 3D reconstruction are examples of computer vision uses that may extract/utilize optical information in a way that is superior to what an unassisted (by computers) person may accomplish. Dimensional metrology is the science and practice of calibrating and using physical measuring equipment to quantify a physical size of or distance from an object. Dimensional metrology is used in industrial applications such as design, manufacturing, and automatic error detections. In computer vision and computer graphics, 3D reconstruction is the process of capturing the shape and appearance of real objects. 3D reconstruction systems are used in various fields, such as robotics, 3D printing, gaming, virtual and augmented reality, reverse engineering, animation, human computer interactions, and so forth.

Unfortunately, existing equipment and systems that perform dimensional metrology or 3D reconstruction are either crudely accurate (to the extent that they are not worth using) or are cost prohibitive, for all but those who specialize in and can invest in extremely expensive optical machinery. For the most part, all others (e.g., entities who would benefit from casual, moderate, or experimental use of dimensional metrology or 3D reconstruction systems) are simply left in the dark.

What is needed is a creative, affordable, and accurate system/solution for performing dimensional metrology and/or 3D reconstruction.

BRIEF DESCRIPTION OF THE DRAWINGS

Reference should be made to the following detailed description which should be read in conjunction with the following figures, in which like numerals represent like parts.

DETAILED DESCRIPTION

Consistent with the present disclosure are embodiments of a system that includes a measurement device to enable dimensional metrology and/or 3D reconstruction. The measurement device is positioned between an object and reference luminaires (e.g., light emitting diodes or other light sources). The measurement device uses the reference luminaires to determine the position and orientation of the measurement device. The measurement device may include a camera oriented towards the reference luminaires and may acquire/use images of reference luminaires to determine the position and orientation of the measurement device. The reference luminaires can be mounted to one or more reference panels that can be arranged into a variety of configurations. Using the reference luminaires, the system provides an efficient, fast, low-cost, and accurate way to determine positions and orientations of the measurement device when the images of the reference luminaires are taken. The system may be configured as a computer vision, light-based, and 3D object dimension measurement system that improves the technical fields of dimensional metrology and 3D reconstruction.

As used herein, computer vision refers to the automatic extraction, analysis and understanding of information from one or more images and may involve the development of a theories and algorithms to achieve automated visual understanding.

As used herein, photogrammetry refers to the science of making measurements from photographs. The input to photogrammetry is a photograph, and the output is typically a map, a drawing, a measurement, or a 3D model of some real-world object or scene.

As used herein, a pinhole camera model refers to a mathematical relationship between the coordinates of a 3D point and its projection onto the image plane of an ideal pinhole camera, in which the camera's aperture is described as a point and no lenses are used to focus light. The pinhole camera model may exclude, for example, geometric distortions or blurring of unfocused objects caused by lenses and finite sized apertures.

As used herein, geometric camera calibration, also referred to as camera re-sectioning, refers to estimating the parameters of a lens and image sensor of an image or video camera. Primarily, geometric camera calibration is related to finding properties that are internal to a camera and that affect the imaging process, including image center, focal length, scaling factors, skew factor, and lens distortions. Use of stereo vision enables the extraction of depth information of a scene using two different points of view. With a single calibrated camera, depth information of a scene may be determined using two or more frames. Depth extraction using a stereo pair of images relies on knowledge of relative positions and orientations of the two cameras. This includes both the relative translation and rotation of the rigid motion transformation in space.

As used herein, stereo camera calibration refers to the process of determining the relative rotation and translation of a stereo camera pair. A change of coordinate transformation is a transformation that converts coordinates from one coordinate system to another coordinate system.

As used herein, a Perspective-n-Point ("PnP") refers to the problem of determining the position and orientation of a camera given the camera's intrinsic parameters and a set of correspondences between 3D points and 2D projections of the 3D points on the camera image(s). PnP is interchangeably referred to as a camera pose estimation. A camera pose includes 6 degrees-of-freedom ("DOF").

As used herein, epipolar geometry refers to the geometry of stereo vision. When two cameras view a 3D scene from two distinct positions, there are a number of geometric relations between the 3D points and their projections onto the 2D images that lead to constraints between the image points. These relations may be derived based on the assumption that the cameras can be approximated by the pinhole camera model. It is noted that the camera calibration, including its principles and practices, may be used to mathematically relate realistic and more complex camera models with the pinhole camera model.

As used herein, dimensional metrology refers to the science and practice of calibrating and using physical measurement equipment to quantify the physical size of or distance from an object. Dimensional metrology is used in industrial applications such as design, manufacturing, and automatic error detections. The dimensional metrology field is made up of three sub-disciplines: linear metrology—concerned with one-dimensional length measurements; angular metrology—concerned with the measurement of angles; and geometrical metrology—concerned with multi-dimensional measurements, e.g. coordinates in 3D space.

As used herein, in computer vision and computer graphics, 3D reconstruction refers to the process of capturing the shape and appearance of real objects to, for example, generate 3D models of the real objects. 3D reconstruction systems may be applied to various fields, such as robotics, 3D printing, gaming, virtual and augmented reality, reverse engineering, animation, human computer interactions, and so forth.

Figure 1:
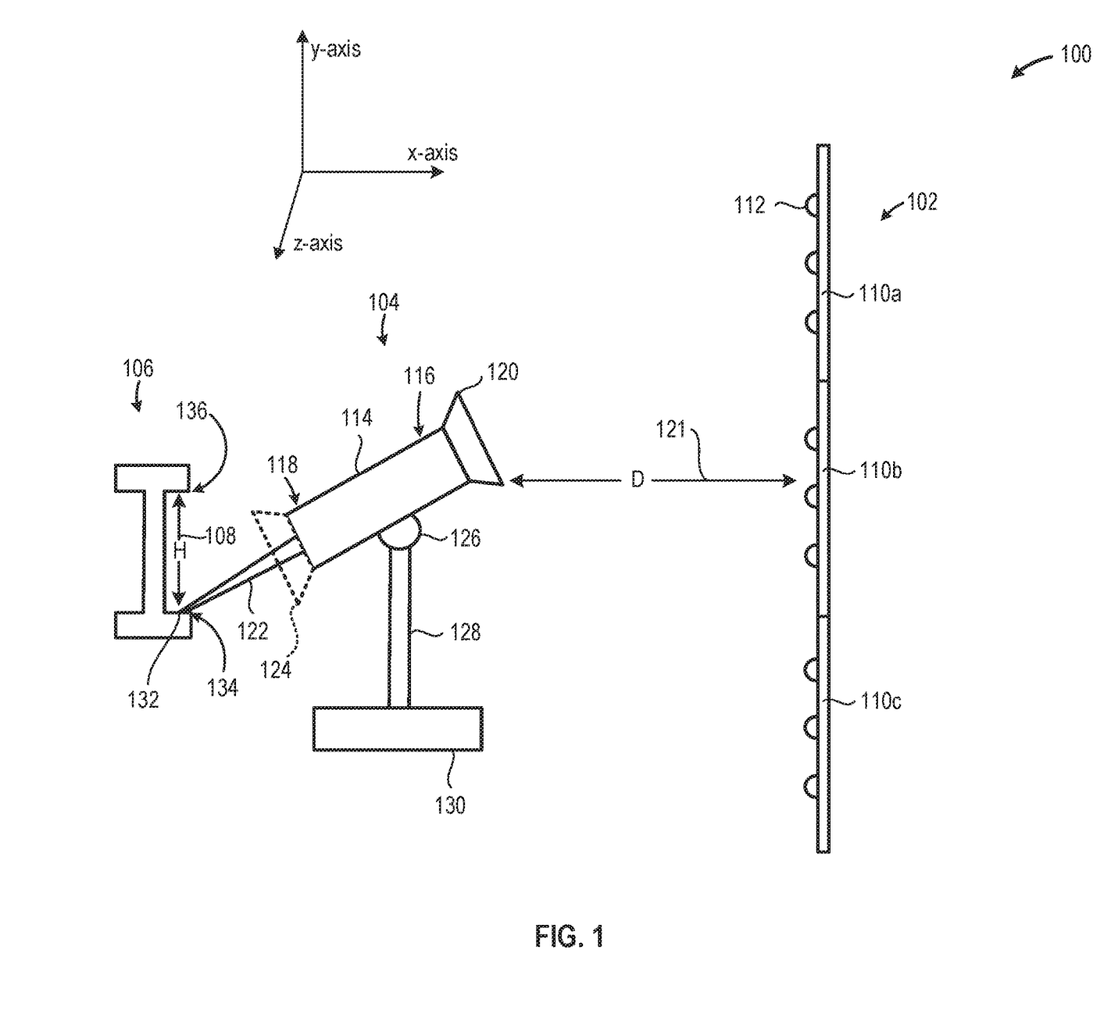
FIG. 1 is a diagram of an example embodiment of a system, consistent with the present disclosure.

FIG. 1 is a simplified block diagram of an example embodiment of a system 100 consistent with the present disclosure. The system 100 may be used for dimensional metrology and/or 3D reconstruction. The system 100 includes a luminaire reference 102, a measurement device 104, and an object 106 (i.e., a measurand) having at least one dimension 108 (e.g., height 'H') that is to be measured, according to an embodiment.

The luminaire reference 102 provides a reference for the measurement device 104 to determine its own position and orientation. The luminaire reference 102 includes a number of reference panels 110 (e.g., inclusive of reference panel 110a, reference panel 110b, and reference panel 110c). Each of the reference panels 110 includes a number of luminaires 112 (e.g., reference luminaires) that provide patterns and that communicate information that enable the measurement device 104 to determine a position and orientation of the measurement device 104, according to an embodiment. Each of the luminaires 112 may be a light emitting diode ("LED"), an incandescent lamp, a phosphorescent lamp, or some other visible or non-visible light source, according to various embodiments.

The measurement device 104 may be oriented in a variety positions and orientations to enable a measurement tool to acquire information related to dimensions of the object 106, according to an embodiment. The measurement device 104 includes a housing 114 having a reference end 116 and a measurement end 118, according to one embodiment. The measurement device 104 includes a camera 120 coupled to the reference end 116, according to an embodiment. The camera 120 is proximate to the luminaire reference 102 and is oriented towards the luminaire reference 102, according to an embodiment. The camera 120 captures pictures of the luminaires 112 to enable the system 100 to calculate a coordinate of the tip of a probe 122. The camera 120 may be an image sensor, a thermal camera, or a similar image acquisition device. The camera 120 may have a lens or may otherwise be configured to detect non-visible light.

The measurement device 104 is positioned a distance ("D") 121 from the luminaire reference 102 or from a particular one of the panels 110 within the luminaire reference 102. The distance 121 may be used by one or more algorithms to determine a coordinate of the probe 122. In particular, using a known distance 121 and a known length of the probe 122 enables the measurement device 104 and/or the system 100 to determine a coordinate of a tip 132 of the probe 122, according to an embodiment. In one embodiment, first image of luminaire reference 102 is captured by the camera 120 and is used to determine 0 degree for the pitch angle, 0 degree for the roll angle, and 0 degree for the yaw angle of the housing 114. In other words, a first image of the luminaire reference 102 may be captured while the housing 114 and the camera 120 are positioned at an initial or first position. In one embodiment, a second image of the luminaire reference 102 is captured by the camera while the housing 114 and the camera 120 are in a non-initial or second position. A center point (e.g., one or more center pixels) of the first image is compared to a center point of the second image to determine the pitch angle, roll angle, and yaw angle of the housing 114 or camera 120 while in the second position. Knowing the pitch angle, roll angle, and yaw angle of the reference end 116, the housing 114, and the camera 120 enables the measurement device 104 to determine a coordinate of the measurement end 118 and any measurement tools coupled to the measurement end 118. Subsequent positions and orientations of the measurement device 104 may be determined using similar techniques.

The measurement device 104 includes a probe 122 or a camera 124 coupled to the measurement end 118, according to an embodiment. The probe 122 or camera 124 is proximate to the object 106 and is oriented towards the object 106, according to an embodiment. The probe 122 and the camera 124 are examples of measurement tools that may be carried by the measurement device 104 and used to perform dimensional metrology and/or 3D reconstruction on the object 106, according to an embodiment. The probe 122 may be one of a number of interchangeable probes. The number of interchangeable probes may have a variety of lengths, shapes, and other dimensions. The probe 122 may include one or more identifiers that may be associated with the characteristics of the probe 122. For example, the probe 122 may be include RFID, embedded chips, labels, or other identifiers that enable the measurement device 104 to automatically identify the probe 122 when coupled to the measurement end 118 of the housing 114.

The measurement device 104 may also include a swivel 126 coupled to a stand 128 that is coupled to a base 130 for supporting the housing 114 of the measurement device 104, according to one embodiment. The swivel 126 may enable the housing 114 to have adjustable pitch, roll, and yaw and x-axis movement. The stand 128 may enable the housing 114 to have adjustable y-axis movement. The base may be mounted on a rail or otherwise enable the housing to have adjustable z-axis movement. The swivel 126, the stand 128, and the base 130 may enable 6 degrees-of-freedom ("DOF") for the housing 114, the camera 120, the probe 122, and/or the camera 124, according to an embodiment. Other hardware may be coupled to the housing 114 to provide 6 DOF for the housing 114, the camera 120, the probe 122, and/or the camera 124, according to an embodiment.

The object 106 is a measurand that is placed proximate to the measurement device 104 to enable the measurement device 104 to determine one or more dimensions (e.g., a distance 108). The object 106 is an I-beam, as an illustrative example. The object 106 may be any object that may be measured by the measurement device 104, according to an embodiment.

In operation, as an example, the measurement device 104 may be configured to determine a distance 108 between two coordinates on the object 106 by determining an orientation and position of the camera 120 while the probe 122 is positioned at each of the two coordinates. In other words, the measurement device 104 (e.g., the camera 120) captures a first reference image of the luminaires while the tip 132 of the probe 122 is at a first coordinate 134, at least partially based on the length of the probe 122. The measurement device 104 then captures a second reference image of the luminaires 112 while the tip 132 of the probe 122 is at a second coordinate 136, at least partially based on the length of the probe 122. The measurement system 104 then determines the distance between the first coordinate 134 and the second coordinate 136 by, for example, subtracting the first coordinate 134 from the second coordinate 136. The system 100 may use one or more of a variety of coordinate systems (e.g., Cartesian coordinates, cylindrical coordinates, spherical coordinates, etc.) for defining coordinates, points, or locations on the object 106.

In operation, as an example, the measurement device 104 may enable 3D reconstruction by acquiring measurement images (of the object 106) and reference images, and by associated the measurement images with the angles (of the camera 120) from which the reference images were captured. In an embodiment, the measurement device 104 utilizes the camera 124 on the measurement end 118 of the housing 114, in place of the probe 122. The measurement device 104 is moved to various positions and/or orientations and captures at least one reference image (of the luminaire reference 102) and at least one measurement image (of the object 106) at each position and/or orientation of the measurement device 140, according to an embodiment. The process of repositioning the measurement device 104 and capturing at least two images is repeated to capture multiple images of the object 106 over a number of views of the object 106. The measurement device 104 or another component in the system 100 associates the measurement images with the reference images and with the calculated positions of the measurement device 104.

The measurement images and the angle information for each measurement image may be provided to one or more 3D reconstruction algorithms or systems to generate one or more 3D models of the object 106. Examples of 3D reconstruction algorithms that may be used include, but are not limited to, 3D reprojection reconstruction ("3DRP"), 3D expectation maximization ("EM"), ordered subset EM ("OSEM"), Markov Random Field ("MRF"), and the like. The 3D models may be used to replicate, scale, and/or analyze the object 106.

Implementation of the system 100 offers a variety of potential advantages over existing technologies. The system 100 is fast and easy to use. The system 100 includes limited infrastructure requirements, other than installation of the luminaire reference 102. The reference panels 110 may be modular to enable customized configuration for applications having various dimensions. The use of the camera 120, the probe 122, and the luminaire reference 102 may provide accurate results at a relatively low cost. The system 100 may be manually operated or robotically operated to capture dimensions or to perform 3D reconstruction of the object 106. The system 100 enables 6 DOF camera position acquisition, which may improve the accuracy of object measurements. The camera 120 may be configured with a short camera exposure time, enabling thorough lighting of the object 106, which may improve image quality and clarity of images of the object. The system 100 may measure any (complicated) dimension of the object 106 that is reachable by the probe 122. The system 100 may employ a variety of probes to support measurements of a variety of objects and dimensions.

Figure 2:
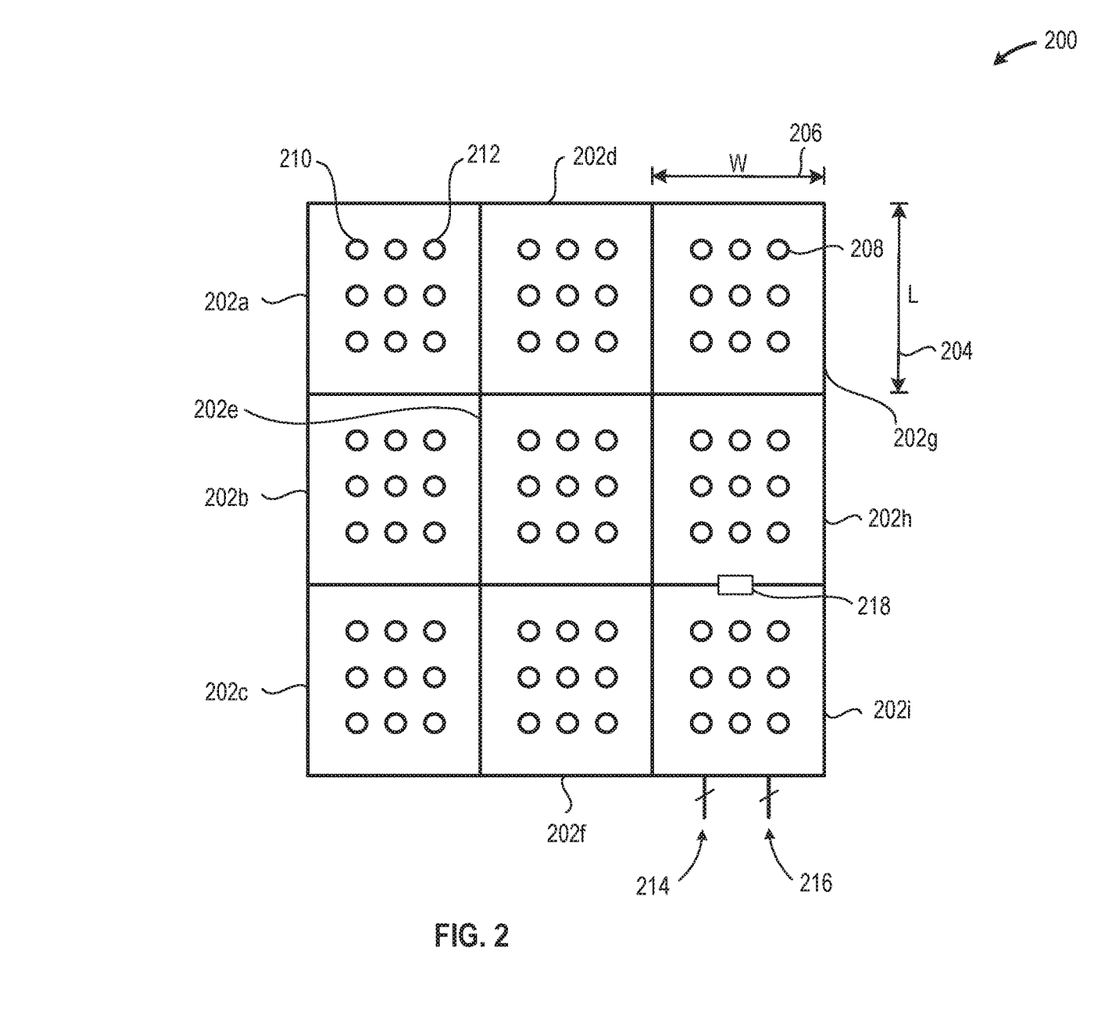
FIG. 2 is a diagram of an example embodiment of a reference panel configuration, consistent with the present disclosure.

FIG. 2 is a simplified diagram of a luminaire reference 200, consistent with the present disclosure. The luminaire reference 200 is an implementation and a front view of the luminaire reference 102 (shown in FIG. 1), according to an embodiment. The luminaire reference 200 includes luminaire panels 202 (e.g., inclusive of luminaire panel 202a, luminaire panel 202b, luminaire panel 202c, luminaire panel 202c, luminaire panel 202e, luminaire panel 202f, luminaire panel 202g, luminaire panel 202h, and luminaire panel 202i), according to an embodiment.

Each of the luminaire panels 202 include a first dimension 204 and a second dimension 206, according to an embodiment. The first dimension 204 may be a length of a luminaire panel 202, and the second dimension 206 may be a width of a luminaire panel 202, according to an embodiment. The first dimension 204 and the second dimension 206 may be consistent among all of the luminaire panels 202, to facilitate coupling the luminaire panels 202 to each other. In an embodiment, luminaire panels are mounted onto one or more brackets, walls, or other structures to provide spatial diversity between the luminaire panels 202.

The each of the luminaire panels 202 include a number of luminaires 208. The luminaires 208 provide a visual reference for the camera (e.g., camera 120 of FIG. 1) of the measurement device to facilitate determining an orientation of the measurement device. Each of the luminaire panels 202 may include a first modulated luminaire 210 and a second modulated luminaire 212. The first modulated luminaire 210 may be intensity or color modulated. That is, the frequency of light or the intensity of light emitted by the first modulated luminaire 210 may be varied to distinguish one luminaire panel from another and to distinguish one luminaire on a luminaire panel from the other luminaires. The second modulated luminaire 212 may be pulse modulated or may otherwise be dynamically modulated to transmit additional identification information for a particular luminaire panel. For example, the luminaire panel 202a may include a second modulated luminaire 212 that transmits an identifier for the luminaire panel 202a. The identifier for the luminaire panel 202a may be a number, a word, and alphanumeric identifier, a location relative to other luminaire panels, or the like, according to various embodiments.

Each of the luminaire panels 202 may also include a power bus 214, a communication bus 216, and an interpanel connector 218, to facilitate the operation of the combined luminaire panels 202. As an example, the power bus 214 may be connected to similar power buses in each of the luminaire panels 202 so that a single power supply may power all of the luminaire panels 202. The communication bus 216 mates with each of the other luminaire panels 202 and may facilitate the luminaire panels 202 each selecting or transmitting an identifier that is unique between the grouped luminaire panels 202, according to an embodiment. The interpanel connector 218 facilitates a physical connection between the luminaire panels 202.

Figure 3:
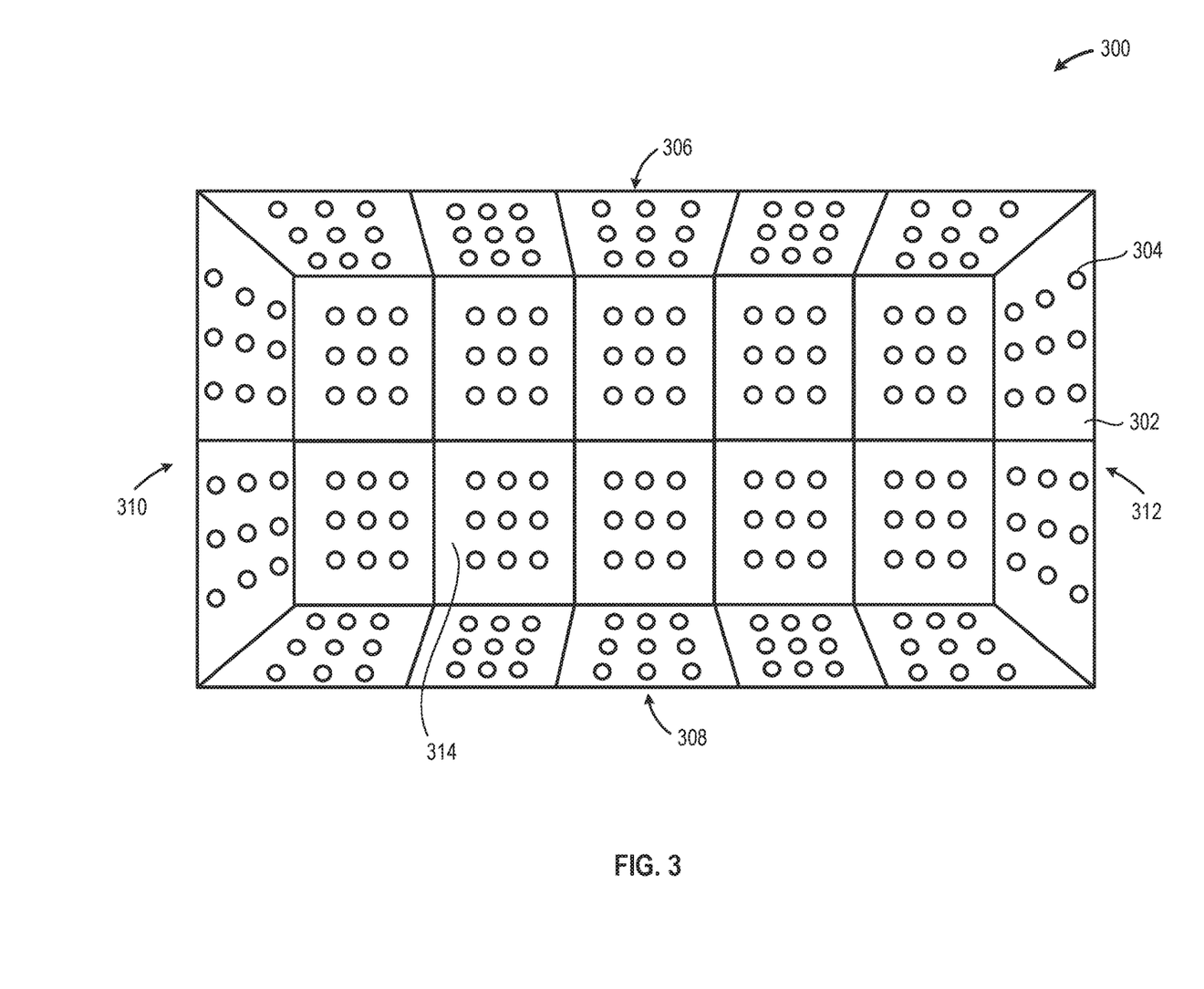
FIG. 3 is a diagram of an example embodiment of a reference panel configuration, consistent with the present disclosure.

FIG. 3 is a simplified diagram of a luminaire reference 300, consistent with the present disclosure. The luminaire reference 300 is an implementation that may include parts or all of the luminaire reference 102 and/or the luminaire reference 200, according to an embodiment. The luminaire reference 300 includes a plurality of luminaire panels 302, which each include a plurality of luminaires 304, according to an embodiment. The luminaire panels 302 may be configured into a luminaire reference ceiling 306, a luminaire reference floor 308, a luminaire reference first wall 310, a luminaire reference second wall 312, and a luminaire reference third wall 314, according to an embodiment. The luminaire reference 300 may be scaled to encompass an entire room, a warehouse, or other space to enable dimensional acquisition of an object using the measurement device 104 (shown in FIG. 1) or a varied embodiment of the measurement device 104, according to an embodiment.

Figure 4A:
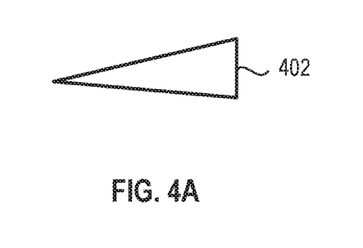
FIGS. 4A-F are example embodiments of a probe, consistent with the present disclosure.
Figure 4B:
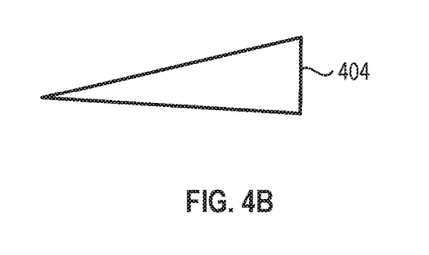
Figure 4C:
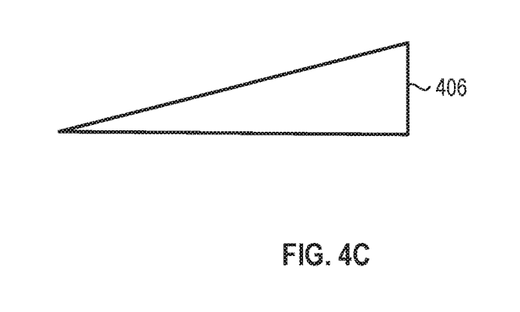
Figure 4D:
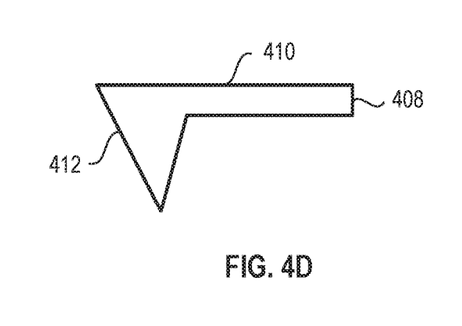
Figures 4E, 4F:
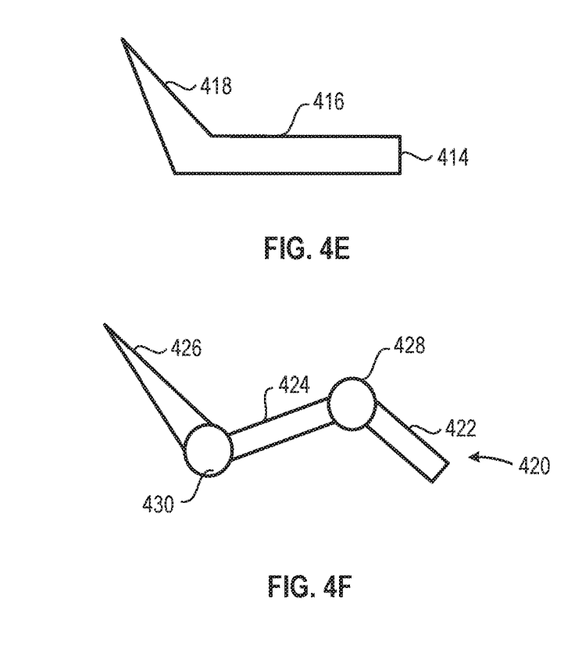

FIGS. 4A-F illustrate various example configurations of probes 400 that may be used as a measurement tool with the measurement device 104 (shown in FIG. 1), according to various embodiments. FIG. 4A illustrates a probe 402 which may be conical or triangular, according to an embodiment. FIG. 4B illustrates a probe 404 that may be conical or triangular, and that may be longer than the probe 402, according to an embodiment. FIG. 4C illustrates a probe 406 that may be conical or triangular, and that may be longer than the probe 404, according to embodiment. FIG. 4D illustrates a probe 408 that may include a shaft 410 and a conical tip 412 that is perpendicular to the shaft 410, according to one embodiment. FIG. 4E illustrates a probe 414 that may include a shaft 416 coupled to a tip 418 (e.g., a conical or triangular tip) that is mounted to the shaft 416 at an angle between 0 degrees and 90 degrees, according to an embodiment. FIG. 4F illustrates a probe 420 that may include a first segment 422, a second segment 424, and a tip 426 that are coupled to each other with an articulating member 428 (e.g., a ball or a knuckle) and an articulating member 430, according to an embodiment. The probe 420 may include a single articulating member or may include more than two articulating members, according to various embodiments.

Figure 5:
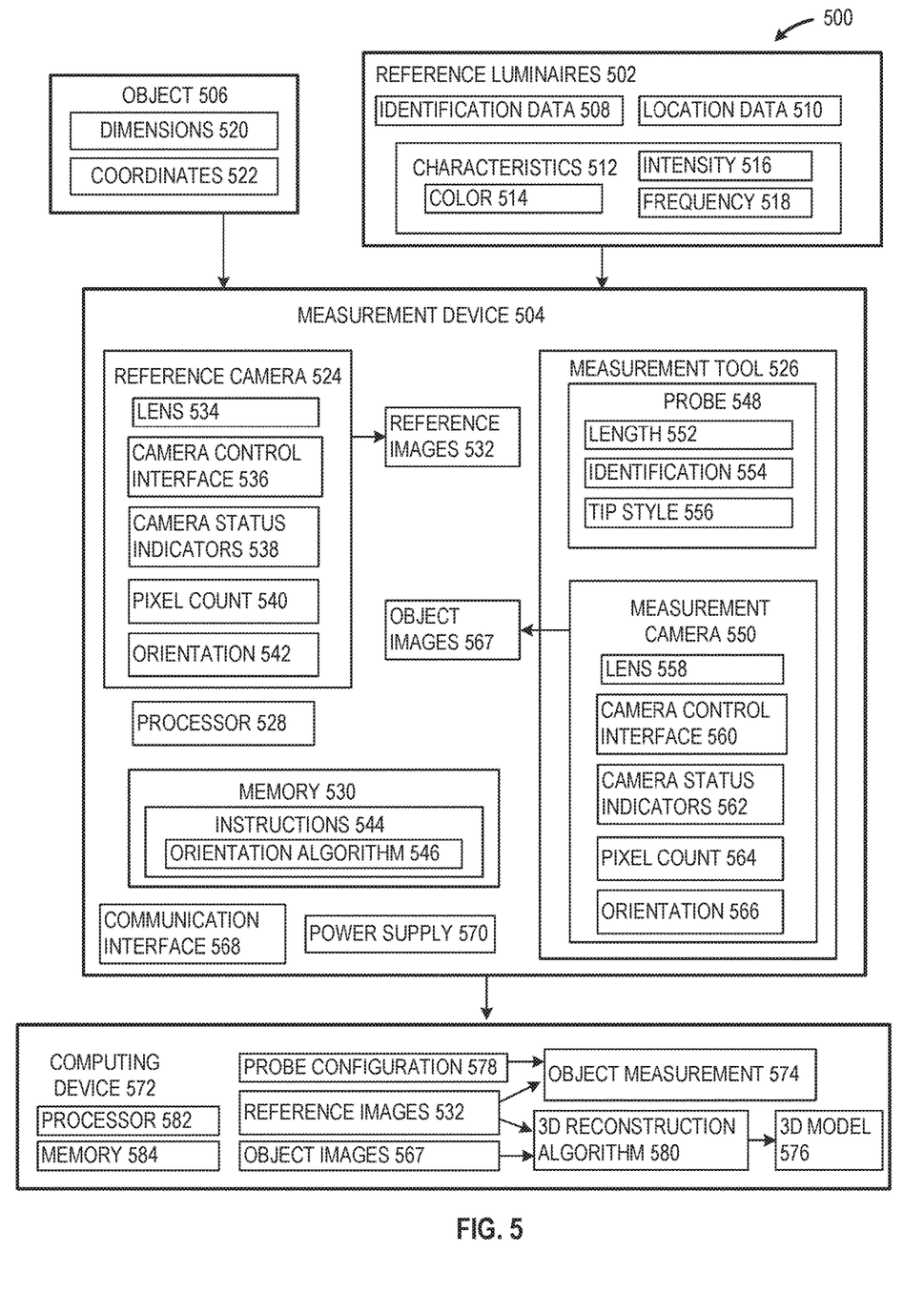
FIG. 5 is a block diagram of an example embodiment of a system, consistent with the present disclosure.

FIG. 5 illustrates a simplified block diagram of a system 500 for performing dimensional metrology and/or 3D reconstruction for an object, consistent with the present disclosure. The system 500 is an example implementation of the system 100, (shown in FIG. 1), according to an embodiment. The system 500 includes reference luminaires 502 that enable a measurement device 504 to determine one or more dimensions of an object 506, according to an embodiment. The reference luminaires 502 are representative of the luminaires 112 (shown in FIG. 1), the luminaires 208 (shown in FIG. 2), and/or the luminaires 304 (shown in FIG. 3), according to various embodiments.

The reference luminaires 502 are configured to provide identification data 508 and/or location data 510 to the measurement device 504 to enable the measurement device 504 to identify an orientation of a reference camera. The identification data 508 may identify a group of luminaires (e.g., a group of luminaires mounted onto a single panel) or may identify a single luminaire, according to an embodiment. Identification data 508 may be transmitted using pulse width modulation, by setting a color temperature of the luminaire, and the like. The location data 510 may indicate a relative location of one or more luminaires with respect to other ones of the reference luminaires 502. For example, the location data 510 may refer to a group of luminaires that are in an upper left-hand corner, a lower right-hand corner, a middle of the ceiling, a corner of the floor, and the like. As another example, the location data 510 may indicate indices of an array of luminaires, to enable the measurement device 504 to identify one or more particular ones of the reference luminaires 502 using array notation, according to an embodiment.

The reference luminaires 502 include characteristics 512, according to an embodiment. The characteristics may include color 514, intensity 516, and frequency 518. One or more of the reference luminaires 502 may have particular characteristics 512 that are distinct from other ones of the reference luminaires 502, to enable the measurement device 504 to identify and/or distinguish particular ones of the reference luminaires 502. For example, the color 514, intensity 516, and/or a frequency 518 of operation may individually or in combination be varied to generate a constellation with which the measurement device 504 may determine a particular orientation of a reference camera.

The object 506 is a measurand from which one or more dimensions 520 are acquired by the measurement device 504, according to an embodiment. The object 506 may have particular features located in particular coordinates 522 with reference to a particular coordinate system, according to an embodiment. The measurement device 504 measures or determines the dimensions 520 by determining the difference between two or more of the coordinates 522 of features of the object 506, according to an embodiment.

The measurement device 504 is an example functional block diagram of the measurement device 104 (shown in FIG. 1), according to an embodiment. The measurement device 504 includes a reference camera 524, a measurement tool 526, a processor 528, and memory 530, according to an embodiment.

The reference camera 524 acquires the identification data 508 and/or the location data 510 by capturing reference images 532 of the reference luminaires 502, according to an embodiment. The reference camera 524 is proximate to and is oriented towards the reference luminaires 502, according to an embodiment. The reference camera 524 includes a lens 534, a camera control interface 536, camera status indicators 538, a pixel count 540, and an orientation 542, according to an embodiment. The camera control interface 536 enables manual or remote control of camera settings, such as exposure time, image capture, multiple image capture, and the like. In an embodiment, since the reference camera 524 is capturing images of luminaires, the exposure time is set to be relatively short (e.g., less than 1 microsecond). The camera status indicators 538 includes LEDs, displays, or other indicators that provide notification of the power status, error status, or other status of the reference camera 524, according to an embodiment. The reference camera 524 may include a pixel count 540 that may include, but is not limited to, 2040×2046, 1280×1024, 2560×1920, or the like.

The measurement device 504 may be configured to determine the orientation 542 for the reference camera 524, at least partially based on the reference images 532, according to an embodiment. The processor 528 may be configured to execute one or more instructions 544 that are stored on the memory 530. The instructions 544 may include an orientation algorithm 546 that determines the orientation 542 (and/or position) for the reference camera 524, at least partially based on the reference images 532, according to an embodiment. The orientation may include, but is not limited to, roll angle, yaw angle, and pitch angle, according to embodiments of one coordinate system.

The measurement tool 526 may be oriented toward the object 506 and is used by the measurement device 504 to determine one or more dimensions 520 for the object 506, based on one or more coordinates 522 of features of the object 506, according to an embodiment. The measurement tool 526 is proximate to and is oriented towards the object 506, according to an embodiment. The measurement tool 526 includes a probe 548 and/or a measurement camera 550, according to an embodiment. The measurement tool 526 may be configured to use the probe 548 to measure one or more dimensions 520 of the object 506, and the measurement tool 526 may be configured to use the measurement camera 550 to construct a 3D model of the object 506, according to an embodiment.

The probe 548 includes a length 552, an identification 554, and a tip style 556, according to an embodiment. The length 552 may be predefined for the probe 548. The length 552 may be different for different styles of probes that may be mated with the measurement device 504. The probe 548 may have an identification 554 that may be transmitted to the measurement device 504 through radiofrequency identification ("RFID"), impedance measurements, embedded computer chips, and the like, according to various embodiments. The identification 554 may identify the tip style 556, the length 552, and/or other characteristics of the probe 548.

The measurement camera 550 includes various features that are similar to the reference camera 524, however, the measurement camera 550 is oriented toward the object 506, while the reference camera 524 is oriented toward the reference luminaires 502, according to an embodiment. The measurement camera 550 includes a lens 558, a camera control interface 560, camera status indicators 562, a pixel count 564, and an orientation 566, according to an embodiment. The orientation 566 of the measurement camera 550 may be the same as the orientation 542 of the reference camera 524, according to an embodiment.

The measurement device 504 may include a communication interface 568 and a power supply 570, according to an embodiment. The communication interface 568 may be a wired communication interface (e.g., USB) and/or may be a wireless communication interface (e.g., Wi-Fi). The power supply 570 may be a battery, another DC voltage source, or an AC voltage source.

The system 500 may also include a computing device 572 that is configured to determine an object measurement 574 and/or a 3D model 576 from information collected by the measurement device 504, according to an embodiment. In an embodiment, the functionality of the computing device 572 is included in the measurement device 504. The computing device 572 may receive a probe configuration 578, reference images 532, and object images 567 from the measurement device 504. The computing device 572 determines the object measurement 574 at least partially based on the probe configuration 578 and the reference images 532, according to an embodiment. The computing device 572 may apply the reference images 532 and the object images 567 to a 3D reconstruction algorithm 580, to generate the 3D model 576 of the object 506, according to embodiment. The 3D reconstruction algorithm 580 may include, but is not limited to, monocular cues techniques such as shape-from-shading, photometric stereo, shape-from-texture, Delaunay technique, zero set method technique, and other 3D reconstruction techniques as known in the art.

The computing device 572 may include a processor 582 and memory 584 for generating or determining the object measurement 574 and the 3D model 576, according to an embodiment.

Figure 6:
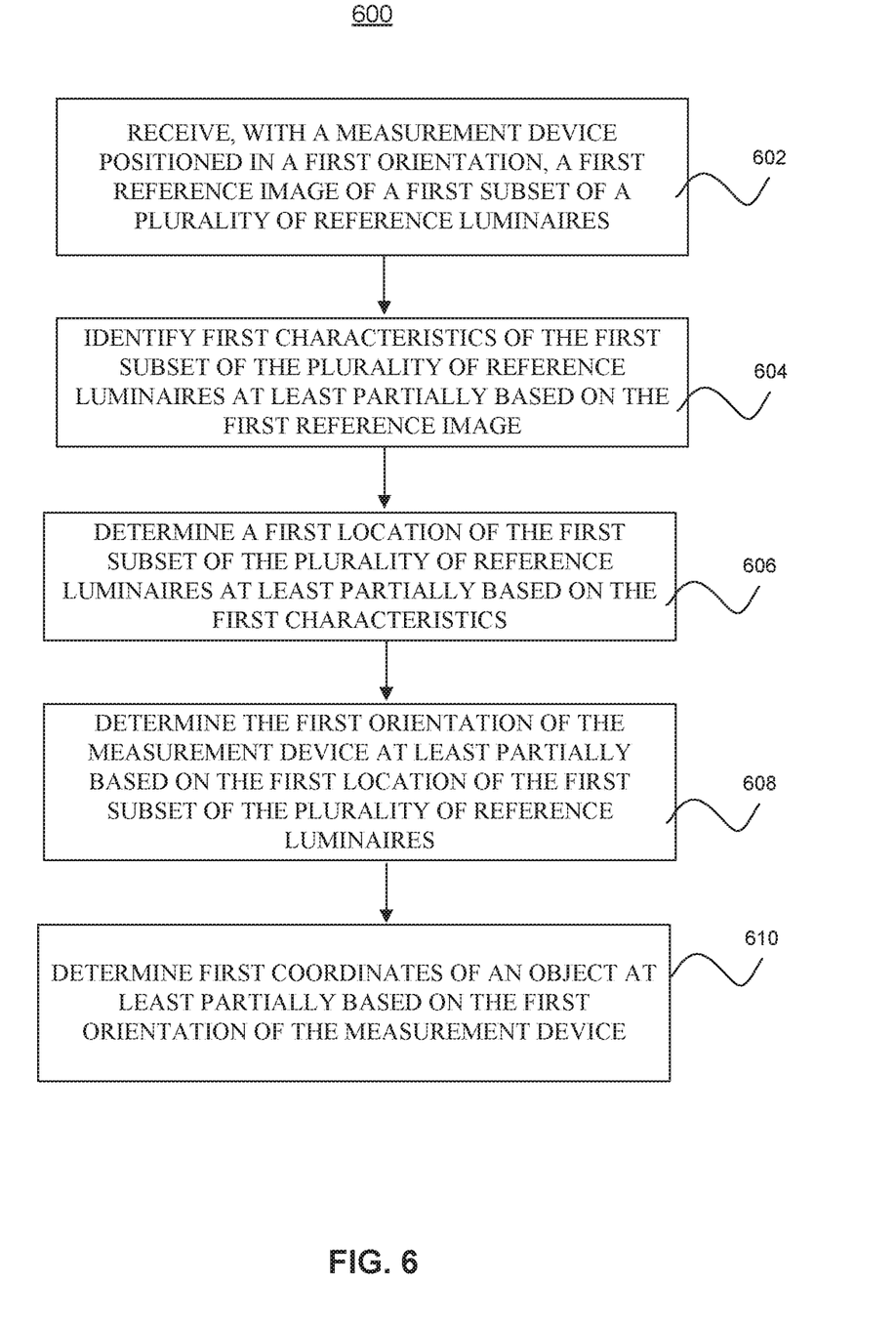
FIG. 6 is a flowchart illustrating an example embodiment of a method, consistent with the present disclosure.

FIG. 6 is a flow diagram of a process 600 for determining dimensions of an object, according to an embodiment. The process 600 may be performed by a measurement tool (such as measurement tool 526) and/or a computing device (such as computing device 572).

At operation 602, the process 600 includes receiving, with a measurement device positioned in a first orientation, a first reference image of a first subset of a plurality of reference luminaires, according to an embodiment.

At operation 604, the process 600 includes identifying first characteristics of the first subset of the plurality of reference luminaires at least partially based on the first reference image, according to an embodiment.

At operation 606, the process 600 includes determining a first location of the first subset of the plurality of reference luminaires at least partially based on the first characteristics, according to an embodiment.

At operation 608, the process 600 includes determining the first orientation of the measurement device at least partially based on the first location of the first subset of the plurality of reference luminaires, according to an embodiment.

At operation 610, the process 600 includes determining first coordinates of an object at least partially based on the first orientation of the measurement device, according to an embodiment.

According to one aspect of the disclosure, there is provided a measurement device. The measurement device may include a housing having a reference end and a measurement end, a camera coupled to the reference end of the housing, the camera configured to capture a first set of images of a plurality of reference luminaires, in which the first set of images are indicative of an orientation and position of the measurement device at a first location, and capture a second set of images of a plurality of reference luminaires, in which the second set of images are indicative of an orientation and position of the measurement device at a second location, a measurement tool coupled to the measurement end of the housing, the measurement tool configured to at least partially define dimensions of an object, and a processor coupled to the camera and to the memory and configured to compare the first set of images to the second set of images to determine a distance between the first location and the second location, and determine at least one dimension of the object based on the distance between the first location and the second location.

In some embodiments, the measurement tool is a probe. In some embodiments, the probe is configured to be manipulated into a number of probe configurations. In some embodiments, the camera is a first camera, and in which the measurement tool is a second camera. In some embodiments, the second camera captures a plurality of images of the object to enable 3D reconstruction of the object. In some embodiments, the processor is further configured to generate a 3D reconstruction model from the plurality of images of the object, and at least partially based on the first set of images and the second set of images. In some embodiments, the measurement device further includes a swivel mounted to the housing to enable six degrees of freedom of rotation of the housing. In some embodiments, the processor is further configured to estimate a color temperature of at least one of the plurality of reference luminaires, determine an identification of the at least one of the plurality of reference luminaires at least partially based on the color temperature, determine a location of the at least one of the plurality of reference luminaires at least partially based on the identification, and determine an orientation and location of the housing at least partially based on the location of the at least one of the plurality of reference luminaires.

In some embodiments, a system includes the measurement device and a plurality of reference panels containing the plurality of reference luminaires. In some embodiments, the plurality of reference panels is configured as at least one of a ceiling, a floor, or a wall for the orientation reference for the measurement device.

According to another aspect of the disclosure, there is provided a method for determining dimensions of an object. The method includes receiving, with a measurement device positioned in a first orientation, a first reference image of a first subset of a plurality of reference luminaires, identifying first characteristics of the first subset of the plurality of reference luminaires at least partially based on the first reference image, determining a first location of the first subset of the plurality of reference luminaires at least partially based on the first characteristics, determining the first orientation of the measurement device at least partially based on the first location of the first subset of the plurality of reference luminaires, and determining first coordinates of the object at least partially based on the first orientation of the measurement device.

In some embodiments, the method further includes receiving, with the measurement device positioned in a second orientation, a second reference image of a second subset of the plurality of reference luminaires, identifying second characteristics of the second subset of the plurality of reference luminaires at least partially based on the second reference image, determining a second location of the second subset of the plurality of reference luminaires at least partially based on the second characteristics, determining the second orientation of the measurement device at least partially based on the second location of the second subset of the plurality of reference luminaires, and determining second coordinates of the object at least partially based on the second orientation of the measurement device. In some embodiments, the method further includes determining a dimension of the object at least partially based on a difference between the first coordinates of the object and the second coordinates of the object.

In some embodiments, the measurement device includes a camera oriented towards the plurality of reference luminaires, and a probe oriented towards the object to enable determining the dimension of the object. In some embodiments, the measurement device includes a first camera oriented towards the plurality of reference luminaires, a second camera oriented towards the object to enable determining the dimension of the object. In some embodiments, the method further includes decoding light pulses from at least one of the first subset of the plurality of reference luminaires to identify the first subset of the plurality of reference luminaires. In some embodiments, the method further includes measuring a light intensity of at least one of the first subset of the plurality of reference luminaires to identify the first subset of the plurality of reference luminaires. In some embodiments, the method further includes receiving a plurality of reference images of the plurality of reference luminaires from a plurality of orientations of the measurement device, determining additional coordinates of the object at least partially based on the plurality of reference images, and generating a 3D reconstruction of the object at least partially based on the additional coordinates of the object.

According to another aspect of the disclosure, there is provided a non-transitory computer readable medium having instructions, which if executed by one or more processors, cause the one or more processors to perform a process including receiving, with a measurement device positioned in a first orientation, a first reference image of a first subset of a plurality of reference luminaires, identifying first characteristics of the first subset of the plurality of reference luminaires at least partially based on the first reference image, determining a first location of the first subset of the plurality of reference luminaires at least partially based on the first characteristics, determining the first orientation of the measurement device at least partially based on the first location of the first subset of the plurality of reference luminaires, and determining first coordinates of the object at least partially based on the first orientation of the measurement device.

In some embodiments, the process further includes receiving, with the measurement device positioned in a second orientation, a second reference image of a second subset of the plurality of reference luminaires, identifying second characteristics of the second subset of the plurality of reference luminaires at least partially based on the second reference image, determining a second location of the second subset of the plurality of reference luminaires at least partially based on the second characteristics, determining the second orientation of the measurement device at least partially based on the second location of the second subset of the plurality of reference luminaires, determining second coordinates of the object at least partially based on the second orientation of the measurement device, and determining a dimension of the object at least partially based on a difference between the first coordinates of the object and the second coordinates of the object.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

As used in any embodiment herein, a "circuit" or "circuitry" may include, for example, singly or in any combination, hardwired circuitry, programmable circuitry, state machine circuitry, and/or firmware that stores instructions executed by programmable circuitry. In at least one embodiment, the system 100 may include one or more integrated circuits. An "integrated circuit" may be a digital, analog or mixed-signal semiconductor device and/or microelectronic device, such as, for example, but not limited to, a semiconductor integrated circuit chip.

Embodiments of the methods described herein may be implemented using a processor and/or other programmable device. To that end, the methods described herein may be implemented on a tangible, non-transitory computer readable medium having instructions stored thereon that when executed by one or more processors perform the methods. Thus, for example, the system 100 may include a storage medium (not shown) to store instructions (in, for example, firmware or software) to perform the operations described herein. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system, comprising:
    a plurality of reference luminaires, wherein the plurality of reference luminaires comprises a subset of luminaires that each emit modulated light that uniquely identifies the luminaire;
    a housing having a reference end and a measurement end;
    a camera coupled to the reference end of the housing, the camera configured to:
        capture a first set of images of the plurality of reference luminaires, wherein an orientation and position of the measurement device at a first location is determined based on the modulated light of the subset of luminaires captured in the first set of images; and
        capture a second set of images of the plurality of reference luminaires, wherein the orientation and position of the measurement device at a second location is determined based on the modulated light of the subset of luminaires captured in the second set of images;
    a measurement tool coupled to the measurement end of the housing, the measurement tool configured to at least partially define dimensions of an object;
    a processor coupled to the camera and to the memory and configured to:
        compare the first set of images to the second set of images to determine a distance between the first location and the second location; and
        determine at least one dimension of the object based on the distance between the first location and the second location.

2. The system of claim 1, wherein the measurement tool is a probe.

3. The system of claim 2, wherein the probe is configured to be manipulated into a number of probe configurations.

4. The system of claim 1, wherein the camera is a first camera, wherein the measurement tool is a second camera.

5. The system of claim 4, wherein the second camera captures a plurality of images of the object to enable 3D reconstruction of the object.

6. The system of claim 5, wherein the processor is further configured to:
    generate a 3D reconstruction model from the plurality of images of the object, and at least partially based on the first set of images and the second set of images.

7. The system of claim 1, further comprising a swivel mounted to the housing to enable six degrees of freedom of rotation of the housing.

8. The system of claim 1, wherein the modulated light comprises at least one of color modulation, intensity modulation, and frequency modulation.

9. The system of claim 1, wherein the plurality of reference luminaires are located on a plurality of reference panels.

10. The system of claim 9, wherein the plurality of reference panels is configured as at least one of a ceiling, a floor, or a wall.

11. A method for determining dimensions of an object, the method comprising:
    receiving, with a measurement device positioned in a first orientation, a first reference image of a first subset of luminaires in a plurality of reference luminaires, wherein each of the first subset of luminaires emit modulated light that uniquely identifies the luminaire;
    identifying the first subset of luminaires at least partially based on the modulated light of the first subset of luminaires captured by the first reference image;
    determining a first location of the first subset of luminaires at least partially based on the identification of the first subset of luminaires;
    determining the first orientation of the measurement device at least partially based on the first location of the first subset of luminaires; and
    determining first coordinates of the object at least partially based on the first orientation of the measurement device.

12. The method of claim 11, further comprising:
    receiving, with the measurement device positioned in a second orientation, a second reference image of a second subset of luminaires in the plurality of reference luminaires;
    identifying the second subset of the plurality of reference luminaires at least partially based on the modulated light of the second subset of luminaires captured by the second reference image;
    determining a second location of the second subset of luminaires at least partially based on the identification of the second subset of luminaires;

determining the second orientation of the measurement device at least partially based on the second location of the second subset of luminaires; and determining second coordinates of the object at least partially based on the second orientation of the measurement device.

13. The method of claim 12, further comprising:

determining a dimension of the object at least partially based on a difference between the first coordinates of the object and the second coordinates of the object.

14. The method of claim 13, wherein the measurement device comprises:

a camera oriented towards the plurality of reference luminaires; and a probe oriented towards the object to enable determining the dimension of the object.

15. The method of claim 13, wherein the measurement device comprises:

a first camera oriented towards the plurality of reference luminaires; and a second camera oriented towards the object to enable determining the dimension of the object.

16. The method of claim 11, wherein the modulated light comprises at least one of color modulation, intensity modulation, and frequency modulation.

17. The method of claim 11, further comprising:

receiving a plurality of reference images of the plurality of reference luminaires from a plurality of orientations of the measurement device;

determining additional coordinates of the object at least partially based on the plurality of reference images; and generating a 3D reconstruction of the object at least partially based on the additional coordinates of the object.

18. A non-transitory computer readable medium having instructions, which if executed by one or more processors, cause the one or more processors to perform a process, comprising:

receiving, with a measurement device positioned in a first orientation, a first reference image of a first subset of luminaires in a plurality of reference luminaires, wherein each of the first subset of luminaires emit modulated light that uniquely identifies the luminaire;

identifying the first subset of luminaires at least partially based on the modulated light of the first subset of luminaires captured by the first reference image;

determining a first location of the first subset of luminaires at least partially based on the identification of the first subset of luminaires;

determining the first orientation of the measurement device at least partially based on the first location of the first subset of luminaires; and determining first coordinates of the object at least partially based on the first orientation of the measurement device.

19. The non-transitory computer readable medium of claim 11, further comprising:

receiving, with the measurement device positioned in a second orientation, a second reference image of a second subset of luminaires in the plurality of reference luminaires;

identifying the second subset of the plurality of reference luminaires at least partially based on the modulated light of the second subset of luminaires captured by the second reference image;

determining a second location of the second subset of luminaires at least partially based on the identification of the second subset of luminaires;

determining the second orientation of the measurement device at least partially based on the second location of the second subset of luminaires; and determining second coordinates of the object at least partially based on the second orientation of the measurement device.

* * * * *